Sept. 19, 1950     C. R. HANNA ET AL     2,523,113
STABILIZING MECHANISM FOR WHEELED VEHICLES
Filed Jan. 10, 1948     5 Sheets-Sheet 1

WITNESSES:

INVENTORS
Clinton R. Hanna, Lawrence B. Lynn
and Stanley J. Mikina.
BY
ATTORNEY

Sept. 19, 1950  C. R. HANNA ET AL  2,523,113
STABILIZING MECHANISM FOR WHEELED VEHICLES
Filed Jan. 10, 1948  5 Sheets-Sheet 2

WITNESSES:
E.A. M'Closkey

INVENTORS
Clinton R. Hanna, Lawrence B. Lynn
and Stanley J. Mikina
BY
ATTORNEY

Sept. 19, 1950     C. R. HANNA ET AL     2,523,113
STABILIZING MECHANISM FOR WHEELED VEHICLES
Filed Jan. 10, 1948     5 Sheets-Sheet 3

WITNESSES:

INVENTORS
Clinton R. Hanna, Lawrence B. Lynn
and Stanley J. Mikina.
BY
ATTORNEY

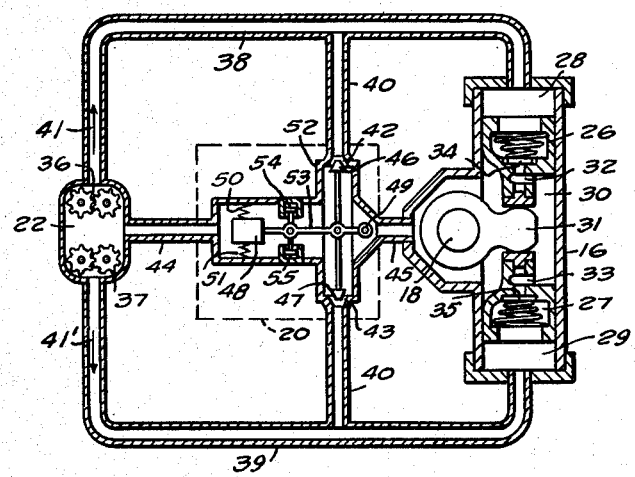
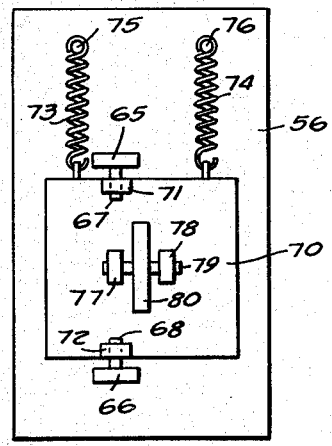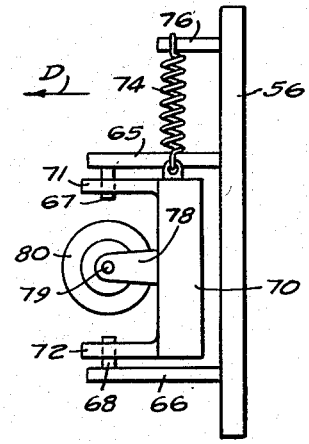

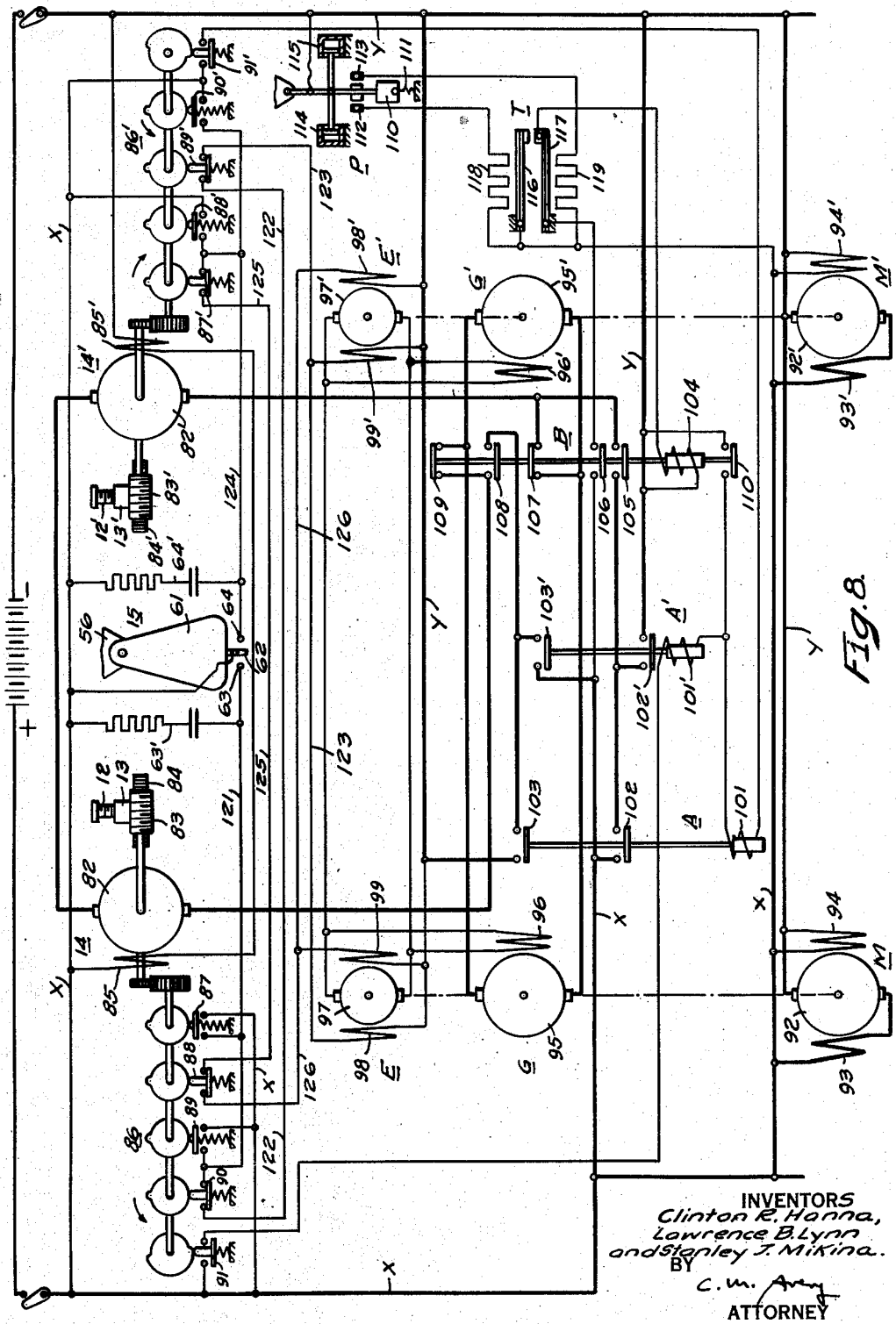

Patented Sept. 19, 1950

2,523,113

UNITED STATES PATENT OFFICE 2,523,113

STABILIZING MECHANISM FOR WHEELED VEHICLES

Clinton R. Hanna, Lawrence B. Lynn, and Stanley J. Mikina, Pittsburgh, Pa., assignors to Westinghouse Electric Corporation, East Pittsburgh, Pa., a corporation of Pennsylvania Application January 10, 1948, Serial No. 1,496

13 Claims. (Cl. 105—210)

Our invention concerns position regulators for vehicles and is related to apparatus of the type disclosed in the copending applications, Serial No. 509,314 filed November 6, 1943, now Patent No. 2,492,990, granted January 3, 1950, of C. R. Hanna, and Serial No. 623,369 filed October 19, 1945, of L. B. Lynn, both assigned to the assignee of the present invention.

More particularly, the invention deals with stabilizing means for correcting the tilt or banking angle of rail vehicles travelling through curves and has for its main objects to provide apparatus of sufficiently high damping whose performance readily permits the free functioning of the spring suspension of the vehicle body when the wheels move up and down. The invention aims also at reducing the energy and space requirements of the tilt or bank control means, as compared with devices of this kind heretofore proposed.

In order to achieve these objects, and in accordance with a feature of the invention, we provide a vehicle with a tilt-responsive mechanism for controlling the angular position of the vehicle body relative to a spring-mounted supporting structure or bolster, and we dispose between the bolster and the wheel journals a normally yieldable linkage which offers little or no opposition to the play of the vehicle springs as regards vertical shocks and vibrations imparted to the wheels but is equipped with an inertia-controlled device that renders the linkage more rigid, or causes it to exert opposing force, relative to vertical movements of the bolster caused by the tilt-responsive mechanism. Thus, the inertia-controlled linkage forms an effective damper or mechanical shunt across the vehicle springs when the tilt-controlling mechanism is called upon to operate and thus relieves the tilt mechanism from acting on the springs. As a result, the power needed to operate the mechanism is correspondingly reduced, and the normal shock-absorbing function of the springs is virtually not interfered with by the tilt regulation.

These and more specific objects and features of the invention will be apparent from the following description in conjunction with the embodiment shown in the drawings.

Fig. 1 is a schematic diagram of a rail vehicle equipped with a position regulator according to the invention. This figure serves mainly for the purpose of explanation and is designed to show as many of the elements of the regulator that can be conveniently presented within a single figure. In general, Fig. 1 may be considered to be a view of the vehicle shown in Fig. 2, taken from the right hand side of Fig. 2.

Fig. 5 is a schematic diagram showing the hydraulic circuits and control elements of the inertia-responsive stabilizing means mounted on the bolster of the vehicle structure according to Figs. 1 to 4.

Figs. 6 and 7 show schematically, in front and lateral views respectively, a tilt-responsive sensing device mounted on the vehicle body for controlling the tilt-correcting mechanisms of the regulator; and Fig. 8 is an electric circuit diagram appertaining to the tilt-responsive control means.

Figure 1:
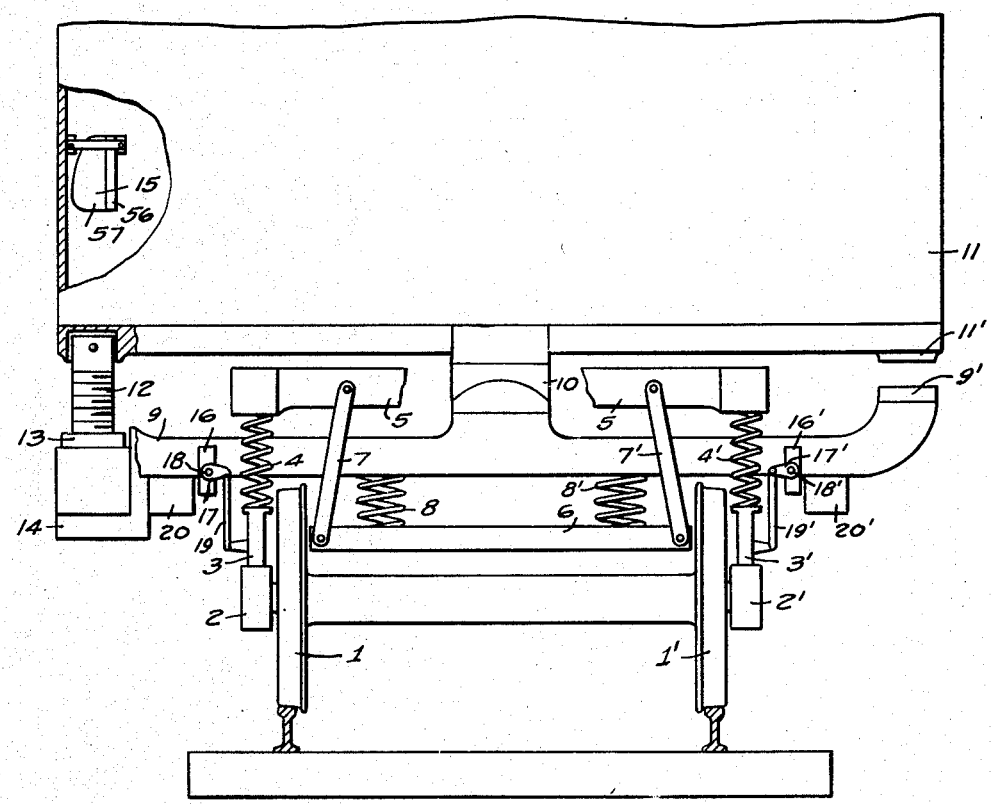
Figure 2:
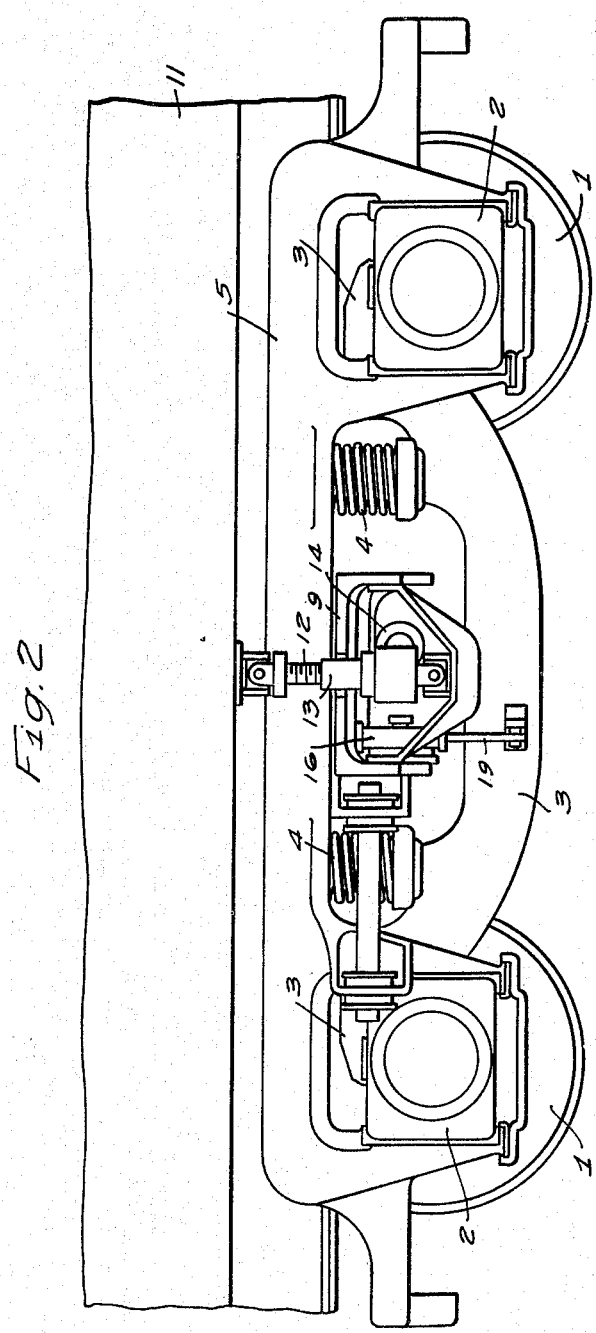
Figs. 2 and 3 show a lateral view and a sectional front view respectively of the truck portion of a vehicle corresponding to the schematic illustration of Fig. 1.
Figure 3:
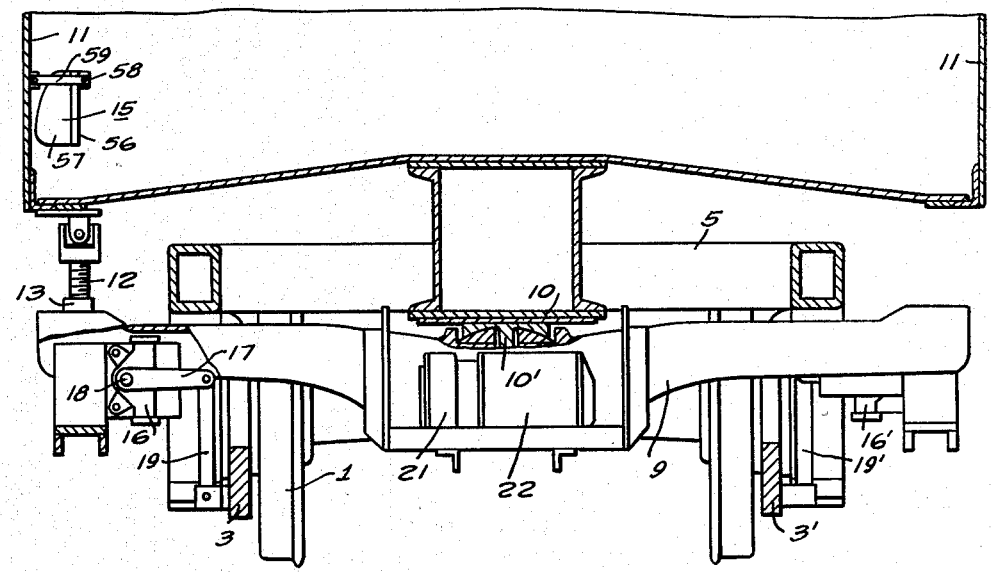
Figure 4:
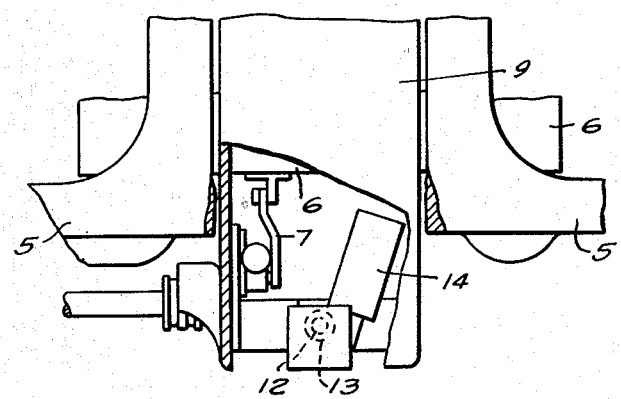
Fig. 4 is a top view of a detail appertaining to the truck structure of Figs. 2 and 3.

The vehicle truck portion, shown schematically in Fig. 1 and more realistically in Figs. 2 and 4, has its wheel and axle structures 1 and 1' journalled in bearings or journal boxes 2 and 2' (Figs. 1, 2). The two journal boxes 2 and 2' on each side of the truck are interconnected by equalizer bars 3 and 3' (Figs. 1, 2). Supported on the equalizer bars are relatively stiff springs 4 and 4' (Fig. 1) which support a truck frame 5. A spring plank 6 is tied to the truck frame 5 by four swing links, one in each corner, of which two are shown at 7 and 7' (Figs. 1, 4). The links allow the spring plank 6 to swing horizontally perpendicular to the track and at a low enough frequency to effectively isolate the car body from wheel flange impacts against the track. A heavy structural centerpiece or bolster 9 extends across truck and car body (Figs. 1, 2, 3, 4) and is supported on the spring plank 6 by relatively soft springs 8 and 8' (Fig. 1). A thrust bearing 10 with a swivel pin 10' (Fig. 3) is mounted on bolster 9 and supports the vehicle body 11 (Figs. 1, 3). The bearing 10 permits a relative swivel movement between body and bolster within a horizontal plane as well as an angular tilting movement of the body relative to the bolster within a vertical plane extending substantially in parallel to the wheel axis. Stability of the stiffly sprung truck frame and of the wheel axles is obtained by guiding the journal boxes 2, 2' in vertical slides of the truck frame 5 adjacent each wheel (Fig. 2). Stability of the car body 11 on the comparatively small-diameter thrust bearing 10 is also secured by thrust blocks, such as the one shown in Fig. 1 at 11', which are fastened at each side to the car body. The thrust blocks are located near thrust pads at both ends of the bolster such as the pad shown at 9' in Fig. 1.

Normally the blocks do not touch the pads. The bolster is wide enough and its thrust pads are long enough to allow the truck to swivel to the extreme angle and still provide support for the blocks 11'.

Linked to the car body 11 is a jack screw 12 which is in threaded engagement with a revolvabe sleeve or nut 13 (Figs. 1, 2, 3, 4). The attachments between jack screw and car body consist of universal joints that allow the truck to swivel relative to the car body and allow the body to tilt relative to the bolster. Crossed-axes type joints may be used for this purpose as well as any other joint designs that restrain the screw from rotation. The sleeve 13 is mounted on bolster 9 and geared to a drive motor 14. Motor 14 is connected to an electric control system which will be described in a later place with reference to Fig. 8. The control system is governed by a tilt-responsive sensing device 15 (Figs. 1, 3) so that the occurrence of incorrect banking of the vehicle body causes the motor to turn the sleeve 13 in order to impart the desired corrective angular movement to the vehicle body relative to the bolster.

By mounting the drive motor 14 on the housing of the jack sleeve 13 (Figs. 1, 2, 3, 4) and letting the motor move with the jack, the geometrical requirements imposed by car and truck rotation are easily satisfied within the confined space available for the tilting mechanism. The particular design shown is capable of being swivelled about either universal joint through a circular cone leaving an included angle of 30°, which is ample for coping with the most severe cross-over track requirements. Moreover, the comparatively large distance between the universal joints 10 (for instance: 23½" in the level position of the car), which is made possible with the integrally-mounted floating motor, reduces to a minimum the dynamic augmentation of wheel flange forces due to the rapid swivelling of trucks on a sharp curve such as a track cross-over. For example, a suddenly applied truck swivel velocity that, as it tilts the bolster, causes the hydraulic linkage (described below) to develop its maximum force of some 1500 lbs., will result in a maximum wheel flange load of only 600 lbs. for a truck with an 8 ft. wheel base and a truck swivel angle of 6° relative to the car body.

The motor 14 is a high-speed direct-current motor and drives the jack sleeve 13 through a worm and worm gear (83 and 84 in Fig. 8), the gear being integral with the sleeve 13. In the design exemplified by the drawings, the speed reduction thus obtained is 40:1. With a double-threaded jack screw of 1⅛" pitch the overall reduction from motor 14 to car body 11 is 9400:1. Hence, at 6000 R. P. M. of the motor, the maximum tilting speed of the car body relative to the bolster is 0.638 R. P. M. or 3.8° per second.

It may be mentioned at this place that all numerical data given in this description refer to one and the same embodiment and serve merely to facilitate understanding the invention by exemplifying applicable orders of magnitude rather than representing obligatory requirements. These data as well as the structural details may be modified depending upon the desiderata of each particular application.

When the above-described tilting mechanism, or any similarly effective tilt control apparatus, is operating, the change in angular position of the car body tends to affect the position of the bolster and the condition of the vehicle springs. For instance, when the car body, with reference to Fig. 1, is being tilted to the left, the load distribution shifts accordingly so that the right side of the bolster tends to drop under compression of the springs 4' and 8'. Consequently, the tilt mechanism and the appertaining drive motors would have to be given a sufficiently large rating to also take care of the work necessary for deforming the springs including the stiff main springs 4 and 4'. However, as mentioned, our invention requires a linkage system between bolster and wheel journal that acts as a damper across the vehicle springs so that the tilt mechanism is virtually not called upon to act on the springs and, hence, can be given a smaller energy and dimensional rating than otherwise possible. To be sure, if the wheel journals and the bolster were tied together by ordinary damping means, such means would jeopardize or nullify the function of the truck springs and swing links and thus interfere with the desired reduction in the transmission of road shocks to the car body. However, such detrimental effects are avoided in the illustrated regulator by designing the linkage as an active hydraulic stabilizing system in the following manner.

Firmly attached to the bolster 9 are two hydraulic cylinders 16 and 16' whose pistons are mechanically coupled with an arm 17 or 17' rotatably mounted on a shaft 18 or 18'. The arms 17 and 17' are linked by members 19 and 19' to the equalizer bars 3 and 3', respectively (Figs. 1, 3). The performance of the cylinder 16 is hydraulically controlled by an inertia-responsive sensing device 20 mounted on the bolster 9. A similar inertia-responsive sensing device 20', also mounted on bolster 9, controls the performance of cylinder 16'. As will be explained below, the hydraulic control operates in such a manner that the arms 17 and 17', as well as the appertaining links 19 and 19', offer little opposition to vertical movements of the respective equalizer bars 3 and 3'. On the other hand, a vertical movement of the bolster 9 at the location of the sensing devices 20 and 20' has the effect of causing the cylinders 16 and 16' to render the appertaining linkage virtually rigid or even to introduce an active stabilizing force between the bolster 9 and the equalizer bar. As a result, the shock-absorbing function of the vehicle springs, in response to vertical vibrations and shocks imparted to the wheel and axle structure, is not detrimentally affected by the linkage elements. On the other hand, when the tilt-correcting jack screws are operating and tend to produce reactive tilting movements of the bolster 9, the hydraulic controlled links are caused to act as mechanical shunts across the vehicle springs. Consequently, the linkage offers no appreciable impedance to the motion of the wheels tending to deflect the springs and swing links, while at the same time any motion of the bolster tending to deflect the same springs and links is strongly resisted with hydraulic forces proportional to the deflection velocity, which in this case is proportional to the absolute velocity of the bolster, sensed by the velocity-responsive inertia devices 20 and 20' at their points of attachment to the bolster. The magnitude of damping required to thus stabilize the car tilting regulator is such as to make the car inertia critically damped on its supporting truck springs.

The hydraulic pressure for operating the control system of the cylinders 16 and 16' is supplied by a set of pumps 21 which is mounted on the bolster 9 together with an appertaining electric drive motor. Further details of the hydraulic system are apparent from the diagrammatic illustration of Fig. 5 and will be described presently.

All elements of the hydraulic system according to Fig. 5, including the cylinder and piston devices, the pump, the inertia-responsive sensing device and all hydraulic connections, are mounted on the bolster so that no flexible conduits or pipe joints are required.

According to Fig. 5 which shows the system for only one of the cylinders, the cylinder 16 contains two pistons 26 and 27 and has two pressure chambers 28, 29 and a centrally located neutral space 30. Piston 26 (Fig. 3) has a duct 32 which forms a communication between pressure chamber 28 and neutral space 30 and is controlled by a normally closed check valve 34. This valve prevents fluid flow from pressure chamber 28 to neutral chamber 30 while permitting, under abnormal pressure conditions, a flow in the opposite direction. Similarly, the piston 27 has a duct 33 between pressure chamber 29 and neutral chamber 30 and is controlled by a normally closed check valve 35 similar to valve 34. Both valves 34 and 35 remain closed under normal operating conditions and do not participate in the control performance proper.

The pump 22 is of the positive displacement type. It has two pairs of impeller gears 36 and 37 which perform the action of two separate pumps, operating simultaneously and having the same operating capacity. The output end of gear unit 36 is connected by a pressure conduit 38 with the cylinder chamber 28. The second outlet of pump 22 is connected by a conduit 39 with the cylinder chamber 29. The two conduits 38 and 39 communicate with each other through a bypass 40 which forms escape openings at 42 and 43 and is in communication with the common inlet or sump of the pump 22 through a neutral conduit 44. The neutral chamber 30 of cylinder 14 is also connected with the pump inlet by a conduit 45. Escape openings 42 and 43 are controlled by valves 46 and 47 which are normally in an intermediate position so as to maintain an average cross-section of the appertaining escape opening.

The valves 46 and 47 form part of the inertia-controlled sensing device 18. The interior of this device is in communication with the low pressure side of the hydraulic system and contains an inertia mass or weight 48 which is pivoted at 49 and centered by biasing springs 50 and 51. The two valves 46 and 47 are mechanically interconnected by a member 52 so that movement of either valve in the opening sense is always accompanied by movement of the other in the closing sense. The member 52 is shown to be connected, at 53, to the inertia mass 48 so that a deflection of the mass relative to the housing of the sensing device causes a corresponding displacement of the two valves. While the connection between member 52 and inertia mass 48 is schematically shown as a direct mechanical linkage, it is preferred to provide a pressure-amplifying hydraulic connection as disclosed in the above-mentioned copending application, Serial No. 509,314; and it should be understood that other details of the sensing device 18 or of the entire hydraulic system may be modified, for instance, as disclosed in the copending applications, Serial No. 623,368, filed October 19, 1945; Serial No. 787,230, filed November 20, 1947; Serial No. 794,145, filed December 27, 1947; and Serial No. 10,162, filed February 21, 1948, all assigned to the assignee of the present invention.

As mentioned, the sensing device 18 is mounted on the bolster 9 (Fig. 1). The mounting is such that the relative movements of mass 48 are substantially vertical about a horizontally extending axis of its pivot 49. Consequently, the inertia control responds exclusively to vertical movement of the truck bolster 9. Hydraulic damping devices 54 and 55 modify the deflective response of the mass 48 so that the deflection is proportional to the velocity of the vertical bolster movement at the point of attachment of the sensing device 18.

When in operation, the pump 22 is constantly driven and issues two separate streams of liquid in the direction of the arrows 41 and 41'. The liquid circulates through the escape openings 42 and 43 back through the neutral conduit 44 to the pump 22. The pressures built up in the two chambers 28 and 29 are normally balanced. Under normal conditions, there is also a path of communication between the two pressure chambers 28 and 29 through conduits 40 and openings 42 and 43. When under these conditions the wheel and axle structure 1 (Fig. 1) is subjected to vertical vibrations or shocks, the link 19 transmits these vibrations to the arm 17 and through the shaft 18 (Fig. 5) and ball member 31 to the pistons 26 and 27.

When the magnitude of vertical vibrations acting on the wheels is so small that such vibrations are absorbed by the springs and not imparted to the bolster 9 (Fig. 1), the corresponding movements of pistons 26 and 27 (Fig. 5) cause the liquid to oscillate through the bypass or conduit 40. With both valves in normal position, the resistance to fluid flow in the bypass is low. Hence, the mechanical linkage formed by elements 16 to 19 (Fig. 1) between bolster 9 and equalizer bar 2 is yielding relative to such vertical wheel movements.

Relative to vertical movements of the bolster, however, the same linkage assumes high or even "negative" rigidity. Any such movement of the bolster is sensed by the mass 48 (Fig. 5) which, due to its inertia, tends to maintain its position in space and hence performs relative motion away from its spring-centered normal location. The relative movement of mass 48 is imparted to the valve assembly so that one valve increases the area of the escape opening controlled thereby, while the other valve decreases the area of the other escape opening. Due to this valve action, the pressure in one of chambers 28 and 29 is raised and that in the other lowered, and a torque is imposed, through member 31 and shaft 18 (Fig. 5), on arm 17 (Figs. 1, 3). The direction and magnitude of the torque are such as to oppose and stabilize the vertical moving tendencies of the bolster. As a result, the linkage 16 to 19 (Fig. 1) behaves as a shunt of considerable mechanical rigidity across the vehicle springs or, depending upon instantaneous conditions, even enforces a positive movement between wheels and bolster in opposition to that normally occurring. Consequently, as far as the operation of the tilt correcting apparatus is concerned, the linkage 16 to 19 is equivalent to a substantially rigid connection between bolster 9 and equalizer bar 3. This will readily be recognized if one assumes that the vehicle is at rest or running on a smooth road so that no vertical vibrations or shocks occur, and that then the jack screws 12 and 12' are purposely operated to tilt the car body 11 relative to the bolster.

While, without the linkage 16 to 19, the tilting of the body 11 would have a reaction on the bolster 9 so that the latter would also tilt and hence compress the springs on one side of the vehicle while expanding the others, the tilting tendency of the bolster is immediately sensed by the inertia mass 48 which causes a counteraction to occur in the hydraulic system (Fig. 5), so that the bolster remains stabilized and prevents the tilt control from affecting the vehicle springs. In actual operation, tilt and vertical vibrations may occur simultaneously, but then also the bolster remains stabilized and continues to form a spacial reference for the tilt correcting apparatus so that the apparatus is neither called upon to waste energy in compressing the springs nor capable of interfering with the desired shock-absorbing performance of the springs.

As mentioned, the operation of the tilt-correcting jack screws 12 and 12' is controlled by the tilt responsive control device 15 (Figs. 1, 3). This device has a base plate 56 and a cover 57. The base plate is pivoted about a horizontal shaft 58 which, in turn, is mounted on a swing link 59, whose other end is pivoted to the body 11 of the vehicle (Fig. 3). Springs (not shown) hold the arm 59 in normally horizontal position. Due to this spring link suspension, the base plate 56 is free to perform angular movements in the plane of illustration of Fig. 3 but largely unaffected by vibratory or other movements of the vehicle body that are to remain without influence on the tilt-controlling performance.

Mounted on the base plate 56 is the tilt-sensing element proper. This element is responsive to gravity and centrifugal force. It consists of a pendulum-type device and is schematically represented in Fig. 8 as a simple pendulum 61 which, when deflected from normal position, brings a movable contact 62 in engagement with a stationary contact 63 or 64, depending upon the direction of deflection. As will be explained below, the contact engagement causes the jack screws to operate in the proper direction until the tilt is corrected and the pendulum 61 again in normal position.

In practice, we prefer designing the tilt-responsing sensing element so that its deflective response depends not only upon the angle of tilt but also on the angular velocity of tilt. To this end, we use a pendulum that is not pendulously mounted in the ordinary sense but is movable about a vertical pivot axis and includes an anticipating rate-responsive gyroscope. Tilt-correcting apparatus with such pendulum-gyroscope devices are disclosed in detail in the above-mentioned copending application, Serial No. 623,369. However, such a device is described in the following to the extent required for a complete understanding of the present invention.

According to Figs. 6 and 7, the base plate 56 of the tilt-responsive sensing device 15 has two standards 65 and 66, each carrying a pivot pin 67 or 68. A pendulous member 70 has two arms 71 and 72 journaled about the pins 67 and 68, respectively. Two helical extension springs 73 and 74 are suspended from studs 75 and 76, respectively, and are attached to the member 70 so that the weight of the member is substantially counterbalanced by the springs when the pivot axis of the pendulous member is in the vertical or zero position shown in Figs. 6 and 7. Two supports 77 and 78 firmly secured to member 70 contain the bearings for the shaft 79 of a gyroscopic rotor 80 which is driven by a small electric motor (not shown) mounted on member 70. The pivot axis of member 70 is identical with the precession axis of the gyroscope and determined by the geometric axis of the pivot pins 67 and 68. The spin axis of the gyroscope rotor, determined by the geometric axis of shaft 79, extends at a right-angle to the axis of pins 67 and 68 and intersects the latter axis. The sway axis of the gyroscopic system is determined by the geometric axis of the pivot point (pivot 10 in Fig. 1 or Fig. 3) of the car body 11 to which the base plate 56 is attached. The direction of travel is indicated in Fig. 7 by the arrow D. The contacts, or other control elements operated in dependence upon the occurrence of a deflection of member 70 about its pivot axis, are not shown in Figs. 6 and 7; they operate in the manner mentioned above in conjunction with contacts 62, 63, 64 and will also be referred to in a later place.

When the base plate 56 of a pilot device designed according to the principles of Figs. 6 and 7 is tilted toward or away from the observer relative to Fig. 6, or in the plane of illustration of Fig. 7, the pendulous member 70 is caused to swing about its pivot axis. The angular velocity of the car body about the sway axis is impressed on the gyroscopic system which develops a precessional torque about pins 67 and 68 in opposition to the deflection of member 70. This precessional torque acts as a damping effect and prevents an overtravel of the car body as it reaches the correct angular position. Due to the fact that the weight of member 70 is largely counter-balanced by springs 73 and 74, the stress imposed on the pivot suspension or bearings of the pendulous member is reduced to a minimum.

In a tilt-sensing device as described above, the gyroscopic torque is algebraically compounded with the gravity torque on the pendulous mass. The contact force at the control contacts of the sensing device will thus have a component proportional to the angular velocity of tilt of the car, as will the contact current signal which is proportional to that contact force. By properly choosing the direction of spin of the gyro, the torque of the jack screw motor due to the gyro signal will oppose the car tilt velocity and thus serves as an additional strong damping and stabilizing influence on the car tilt regulator.

The control performance of the tilt-responsive sensing device 15 will now be explained with reference to Fig. 8 in which, it will be remembered, the sensing device, responsive to gravity and centrifugal force, is symbolically represented by a simple pendulum 61 which, when deflected from its normal position, closes a circuit between contacts 62 and 63 or between contacts 62 and 64 depending upon the direction of deflection. Spark-suppressing shunt circuits 63' and 64', each containing a resistor and a capacitor, are connected across the gaps between contact 62 and contacts 63, 64 respectively.

As apparent from Fig. 8, two threaded sleeves 13 and 13' for operating respective jack screws 12 and 12' are driven from the respective armatures 82 and 82' of motors 14 and 14' through a worm shaft 83 or 83' and a worm gear 84 or 84', the worm gear being mounted on, or integral with, the sleeve 13 or 13' as previously mentioned. The respective field windings of motors 14 and 14' are denoted by 85 and 85'.

The two jack screws and appertaining drive equipment belong to the two respective trucks of a railroad car. We prefer arranging the two jack screws on opposite sides i. e. at diagonally opposite points of the car body. Consequently, when the car body is tilting relative to the two trucks, one jack screw must move out of the appertaining sleeve while the other screw moves into its sleeve. The illustrated control system secures a simultaneous operation of the two jack screws in initially opposing directions.

The shaft of motor 14 is geared to a switch assembly 86 with five contacts denoted by 87, 88, 89, 90 and 91. Motor 14' is equipped with a corresponding limit switch 86' whose contacts are denoted by 87' to 91'. Contacts 91 and 91' are discriminator switches. Both are open when the car body is in midposition relative to the bolster, and either of them closes whenever the body is tilted in one or the other direction. The other contacts are limit switches. Contacts 89 and 90 are actuated when the jack screw 12 reaches a predetermined upper limit position, and contacts 87' and 88' have the same limit performance for jack screw 12'. Contacts 87, 88 and 89', 90' are actuated when respective jack screws 12 and 12' reach predetermined lower limit positions. The contacts are controlled by respective cams and consist preferably of small snap switch units. The cam shafts of the switch assemblies 86 and 86' are driven through respective reduction gears so that each cam revolves about one half revolution for the total travel distance of each jack screw (11½"). The transmission between jack screw and contacts includes dead play (corresponding to ¼" to ½" in the jack screw position) for a purpose referred to in a later place.

The motors 14 and 14' form part of a Ward Leonard system with two main generators G and G' and two excited generators E and E'. Generators G and E are driven by a motor M. A corresponding motor M' is provided for generators G' and E'.

The armature 92 of motor M cooperates with a series field winding 93 and a shunt field winding 94. Excitation for the motor M is provided through mains X and Y fed from the battery line of the rail vehicle usually operating with 28 volts direct current. The armature of generator G is denoted by 95 and the appertaining field winding by 96. Winding 96 receives excitation from the armature 97 of exciter E under control by the two exciter field windings 98 and 99. The corresponding elements of the motor generator set appertaining to the jack screw motor 14' are denoted by 92' through 99', respectively.

A control relay A, appertaining to the control circuits for motor 14, has a control coil 101 for actuating two contacts 102 and 103. A similar relay A' with a coil 101' and contacts 102', 103' is provided for motor 14'.

A transfer relay B connects the jack screw motors normally to the respective motor generator sets, but switches the jack screw motors automatically to the mains X and Y in response to the occurrence of of an excessive tilting angle of the vehicle body. The coil 104 of transfer relay B actuates five contacts denoted by 105 through 109. The excitation of relay coil 104 is controlled by a secondary pendulum 110 which senses failure of the normal control whenever the deviation of the car angle from its desired tilt exceeds a predetermined amount. The use of a secondary pendulum for detection of an abnormal error from the desired car position is resorted to because the desired or reference position of the car is continuously varying depending upon the train speed, track curvature and initial track bank.

The secondary or safety pendulum 110 consists of a suspended pendulum bob upon which is mounted an electric contact interposed between two stationary contacts 112 and 113. The pendulum is mounted on the vehicle body, and its bob is pulled down by a tension spring 111 acting perpendicular to the car floor in addition to the force of gravity. The function of the biasing spring is to shorten the pendulum period and thus make it respond more rapidly to errors in car tilt. Free oscillations of the safety pendulum are damped by means of hydraulic dampers or similarly acting devices schematically represented at 114 and 115. The contact gap is set to close at a tilt angle that is definitely larger than will occur during the normal proper operation of the tilting drive. For instance, since the maximum transient error to be normally expected is only about 1°, setting the contacts 112 and 113 to close at 2° tilt error will insure transfer of the jack screw drive to battery operation only upon a positive indication of a primary control failure. To further guard against unnecessary disconnection of the motor generator drive by the relay B, the contacts 112 and 113 of the safety pendulum 110 are made to operate the coil 114 of relay B through a time delay relay T whose contact closes with a delay period of two to three seconds. This prevents the operation of transfer relay B due to normal vibration of the safety pendulum contacts by car jolts. Various types of time delay relays are applicable. The one shown in Fig. 8 is a thermal relay with two bimetallic contact members 116 and 117 controlled by respective heating coils 118 and 119. The provisions of two bimetal elements, whose free ends have to engage each other in order to close the control circuit, has the advantage that the relaying performance is substantially independent of changes in ambient temperature.

Referring now to the control system of Fig. 8 as a whole, it will be noted that the armatures 95 and 95' of respective generators G and G' are parallel connected, and the armatures 82 and 82' of the jack screw motors are series connected across the generator armatures through contacts 107 and 109 of relay B. The series connection secures an equal division of the tilting load on the two jacks and has also the effect that both jack screws become inoperative together in the event of failure of either, which is an essential advantage in view of the self-locking or irreversibility feature of the screws. For the same reason, the field windings 85 and 85' of the jack screw motors are also series connected. These field windings lie across mains X and Y and hence receive constant excitation.

The operation of the jack screw motor depends upon whether or not the main generator field windings 96 and 96' are energized. Generator field windings 96 and 96' are separately connected across the parallel-connected armatures 97 and 97' of the exciters E and E'. Hence, the field excitation of the main generators depends upon the excitation of the exciter field windings 98, 99, and 98', 99'. Field windings 98 and 99' are parallel connected and, when energized, cause the exciters E and E' to provide the main generator field windings with excitation of the polarity required to make motor 14 move the jack screw 12 upward while motor 14' moves the jack screw 12' downward. Exciter field windings 99 and 98' are also connected in parallel to each other and, when energized, cause motor 14 to move jack screw 12 downward and motor 14' to move jack screw 12' upward. One terminal of each field winding 98, 99, 98', 99' is attached to main Y. The other terminals of windings 98 and 99' are connected to contact 63 of the sensing device 15; and the other terminals of windings 99 and 98' are connected to contact 64 of the device 15. When the car body has the correct angular position, contacts 63 and 64 are open, all excited field windings are dead, and the motors 14 are at rest.

When the angular position of the car body is incorrect so that contact 63 closes, the field windings 98 and 99' are excited from mains X and Y in the circuit:

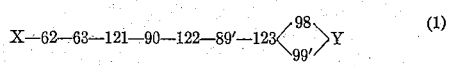

Motors 14 and 14' then run in the direction required to correct the angular position. Both motors stop when the correct position is reached because the contact 63 is then opened.

When the angular position is incorrect in the other sense, contact 64 closes and excites field windings 99 and 98' in the circuit:

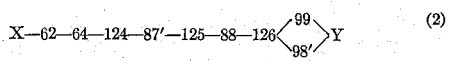

the motors 14 and 14' then run in the other direction until the angular position of the car body is correct.

During normal operation, the coil 101 and 101' of relays A and A' remain deenergized because the circuit of both coils extend through contact 110 of relay B, and contact 110 remains open as long as no excessive tilt angle is encountered which could cause the safety pendulum P to energize the coil 104 of relay B.

If the jack screw 12, moving upward during normal operation of the system, reaches the limit position, contact 90 of switch assembly 86 opens and contact 89 closes. The jack screw 12' then reaches its lower limit position so that contact 90' of assembly 86' closes and contact 89' opens. When that occurs, the field circuit (1) is interrupted at contact 90. Hence, the upward movement of jack screw 12 and the simultaneous downward movement of jack screw 12' are stopped. Instead the contact 90', now closed, completes a field circuit for windings 99 and 98' as follows:

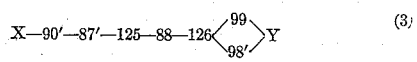

The energization of field windings 99 and 98' imposes dynamic braking on the jack screw motors and causes them to reverse and back the jack screws away from the limit positions. As a result, contact 90' opens and interrupts the reversed field circuit (3). Due to the above-mentioned dead play in the transmission from jack screw motor to switch contacts, the contact 90 is then still open. Consequently, the jack screw motors stop near the limit positions until the banking angle of the car body changes through normal to an incorrect value in the opposite sense. Then the contact 64 is closed and the circuit (2) comes into operation to resume the control performance. If the jack screw 12 travels downward and reaches the limit position while screw 12' reaches the upper limit, contacts 87, 88 and 87', 88' are actuated and stop the motors in a similar manner. In either case, the overtravel of the jack screws, upon tripping the limit switches, is kept to a minimum.

The closing of the time delay relay T, due to failure of the primary control, energizes the coil 104 of relay B. Relay B then opens its normally closed contacts 107 and 109 to disconnect the motors 14 and 14' from the motor generator sets and closes the contacts 108 and 105 which connect the motors 14 and 14' to the battery mains X and Y. The jack screws are then operated to automatically run the car body back to its central position and leave it there until the primary control can be repaired at the end of the train run. Since the transfer to battery operation may occur with the car body tilted to either side of its central position, the battery connection must have the right polarity for centering the car from either side. This correct polarity is secured by the discriminator switch contacts 91 and 91' of the switch assemblies 86 and 86' and by the respective relays A and A' which these contacts control. For instance, when the car body is tilted to the right (relative to Fig. 1), contact 91 is open and contact 91' is closed. If a failure occurs which causes relay B to respond, switch contact 91' and contact 104 of relay B energize coil 101 of relay A in the circuit:

$$X—91'—101—110—Y \qquad (4)$$

so that relay A picks up and closes its contacts 102 and 103. The armatures 82 and 82' of the jack screw motors are then energized from mains X and Y in the circuit:

$$X—102—105—82'—82—108—103—Y \qquad (5)$$

the motors now run the jack screws back to the center position in which both discriminator contacts 91 and 91' are opened.

Conversely, if the car body is tilted to the left (relative to Fig. 1), contact 91' is open and contact 91 closed, so that a response of relay B causes coil 101' of relay A' to be energized in the circuit:

$$X—91—101'—110—Y \qquad (6)$$

Relay A' and relay B then connect the motor armatures in the circuit:

$$X—102'—105—82'—82—108—103'—X \qquad (7)$$

This circuit is similar to circuit (5) but energizes the motor armatures 82' and 82 in reversed polarity. Consequently, the motors again tilt the car body back to center position.

After the just-mentioned recentering of the car body, the body is held in position by the self-locking jack screws so that the car battery is no longer called upon to supply power. This provision of direct battery operation as a secondary safety measure for recentering the car body in emergencies is based on the fact that the jack screw motors are the part of the electrical equipment the least likely to fail, since their duty cycle is such that they are inactive most of the time, operating only on curves. Such a highly intermittent load factor makes it possible to dispense with additional safety return drives in the form of complicated mechanical means such as coupled air motors or tripped set-up springs. If desired, however, provision can readily be made to operate the jack screws manually by a crank, for instance, for adjusting or test purposes or for centering the car body without the use of the car battery.

The high damping forces possible with active type hydraulic stabilizing equipment for shunting the vehicle springs relative to tilt performance are not only essential for tilt regulator stability, but they also play an important part in reducing the transient tilt error of the car on the transition spiral track connecting the straight track with the track of constant curvature and constant bank. Since the jack-screw can tilt the car only by pushing against the softly sprung bolster, it is evident that any yielding of the bolster before it can provide an adequate reaction for the jack screw will result in a proportionate increase in the deviation of the car from its desired tilt angle on the spiral track. However, the presence of the inertia-controlled valves on the ends of the bolster makes it possible for the hydraulically controlled cylinder to provide a large reaction force for the jack screws at low vertical velocities of the bolster before any appreciable deflection of the springs has occurred. For instance, we found that on a spiral track that is traversed in 3.4 seconds at a vehicle travelling speed of 100 M. P. H., the maximum transient error that may occur while the car body is being tilted to its proper bank angle of 12° is only 1°. As the car enters the track of constant curvature, the above error is rapidly reduced to a fraction of a degree, depending then only on the sensitivity of the gyro-pendulum in sensing car deviations from the required bank.

We have found that a regulator according to our invention, to which the above given examples of commercial data apply, permits obtaining a tilt drive stiffness of 4,000,000 ft. lbs. per radian at a regulator frequency of 1 cycle per second and a damping of 80% decay in amplitude per cycle, the maximum transient error of the car on a spiral track being only 1° (all figures being approximate). In contrast thereto, calculations for a tilt regulator using passive-type shock absorbers between bolster and journals and having ¼ critical damping which if excluded would severely bind the wheel motions, instead of the inertia-controlled linkage required by the invention, showed that for the same regulator stiffness of 4,000,000 ft. lbs. per radian the system damping is reduced to zero. In further comparison with the invention, a tilt regulator designed to achieve tilting and damping functions with a single power drive, as by means of a single hydraulic cylinder acting between equalizer bars (journals) and car body, requires a very considerable increase in power requirements, for instance 10 to 1, over a regulator according to the invention as a result of having to compress the bolster springs. Besides, the large spring force due to the tilting motion of the car requires cylinders of correspondingly large area with consequent large volumetric delivery of oil to them. This in turn necessitates the use of large valves and large valve openings for controlling this flow. The large time delays inevitable with large valve motions cause the hydraulic damping forces to be reduced in effectiveness as a result of phase lags and thus to reduce the stability of the tilt regulator.

The advantages of the invention go beyond those apparent from the foregoing comparison. The linkage of inertia-controlled damping for preventing the tilt mechanism from acting on the vehicle springs, has also the effect of stabilizing the bolster and car body relative to vertical road shocks and vibrations that might otherwise be transmitted through the springs due to track irregularities. Consequently, the regulator considerably improves riding comfort not only during curved travel but also on straight track operations. Another advantage of the regulator is the fact that, although its tilt corrective and damping components cooperate in the above-described manner, they nevertheless involve two separately operating drives or power systems each of which is capable of, or adjustable for, functioning at maximum efficiency without being compromised by the differing requirements of force and velocity of the other system.

Although in the interest of clarity we have limited ourselves to the illustration and description of substantially a single embodiment of the invention, it will be obvious to those skilled in the art that the component systems as well as the component elements and circuits can be altered and modified in various respects without departing from the essence and features of the invention. As a matter of fact, a consideration of the disclosures contained in the above-mentioned copending applications immediately reveals a number of specific other designs of the regulator components that are applicable in conjunction with the present invention instead of those here specifically represented. Hence, the invention as defined in the annexed claims can readily be embodied in structure other than that specifically exemplified in this disclosure.

We claim as our invention:

1. In combination, a wheeled truck, a bolster, spring means supporting said bolster on said truck, a car body pivotally mounted on said bolster to permit banking of said body, power-operated tilting means disposed between said bolster and said body, a sensing device responsive to gravity and centrifugal force disposed on said body and connected to said tilting means for controlling the latter, power-operated damping means disposed between said truck and said bolster across said spring means, a power source connected to said damping means, and inertia controlled sensing means disposed on said bolster and connected to said damping means for controlling the supply of power from said source to said damping means for controlling the latter to resistively shunt said spring means relative to forces resulting from operation of said tilting means.

2. In combination, a wheeled truck, a bolster, spring means supporting said bolster on said truck, a car body pivotally mounted on said bolster to permit banking of said body, power-operated tilting means disposed between said bolster and said body, a pendulous pilot device responsive to banking disposed on said body and connected to said tilting means, hydraulic power damping means disposed between said truck and said bolster across said spring means, a pump connected to said damping means, inertia controlled valve means responsive to vertical movement disposed on said bolster and connected between said pump and said damping means for controlling the latter to resistively shunt said spring means.

3. The combination of wheel means, a journal structure for said wheel means, a bolster, vehicle spring means movably supporting said bolster on said journal structure, a vehicle body pivotally mounted on said bolster for angular movement relative to said bolster substantially in a vertical plane in parallel to the axis of said wheel means, a tilt-correcting mechanism disposed between said body and said bolster for varying the angular position of said body relative to said bolster, reversible drive means connected to said mechanism, control means having a tilt-responsive sensing device mounted on said body for controlling said drive means in response to occurrence of incorrect banking of said body to operate said mechanism in corrective direction, a normally yieldable mechanical linkage linked to said structure and to said bolster so as to exert relatively low opposing force to vertical movements of said structure, said linkage including control means for controlling said opposing force, and an inertia-responsive sensing device mounted on said bolster and connected with said control means for causing said linkage to exert relatively high opposing force to vertical movement of said bolster due to tilt-correcting operation of said mechanism in order to mechanically shunt said spring means relative to said operation.

4. The combination of wheel means, a journal structure for said wheel means, a bolster, vehicle spring means movably supporting said bolster on said journal structure, a vehicle body pivotally mounted on said bolster for angular movement relative to said bolster substantially in a vertical plane in parallel to the axis of said vehicle means, a tilt-correcting mechanism disposed for varying the angular position of said body relative to said bolster and having a jack screw linked to said body and a nut in threaded engagement with said jack screw and revolvably mounted on said bolster, a reversible electric motor disposed on said bolster in driving connection with said nut, an electric control system connected with said motor and having a tilt-responsive sensing device mounted on said body for controlling said motor in response to occurrence of incorrect banking of said body to operate said mechanism in corrective direction, a normally yieldable mechanical linkage linked to said structure and to said bolster so as to exert relatively low opposing force to vertical movements of said structure, said linkage including control means for controlling said opposing force, and an inertia-responsive sensing device mounted on said bolster and connected with said control means for causing said linkage to exert relatively high opposing force to vertical movement of said bolster due to tilt-correcting operation of said mechanism in order to mechanically shunt said spring means relative to said operation.

5. The combination of a vehicle body having two wheeled trucks, each truck having a wheel journal structure and a bolster and spring means movably supporting said bolster on said journal structure, said vehicle body being pivotally mounted on said two bolsters for angular movement relative thereto substantially in a vertical plane transverse to the travelling direction, a tilt-correcting mechanism disposed for varying the angular position of said body relative to said bolsters and having two jack screws linked to said body at diagonally opposite points thereof and two revolvable nuts mounted on said respective bolsters in threaded engagement with said respective jack screws, two reversible electric motors mounted on said respective bolsters in driving connection with said respective nuts, an electric control system connected with said two motors and having a tilt-responsive sensing device mounted on said body for controlling said motors to operate simultaneously so as to lift either jack screw when lowering the other jack screw relative to said respective bolsters, each truck having a normally yieldable mechanical linkage linked to said structure and to said bolster of said truck so as to exert relatively low opposing force to vertical movements of said structure, said linkage including control means for controlling said opposing force, and an inertia-responsive sensing device mounted on said bolster and connected with said control means for causing said linkage to exert relatively high opposing force to vertical movement of said bolster due to tilt-correcting operation of said mechanism in order to mechanically shunt said spring means of each truck relative to said operation.

6. The combination of wheel means, a journal structure for said wheel means, a bolster, vehicle spring means movably supporting said bolster on said journal structure, a vehicle body pivotally mounted on said bolster for angular movement relative to said bolster substantially in a vertical plane in parallel to the axis of said wheel means, a tilt-correcting mechanism disposed between said body and said bolster for varying the angular position of said body relative to said bolster, reversible drive means connected to said mechanism, control means having a tilt-responsive sensing device mounted on said body for controlling said drive means in response to occurrence of incorrect banking of said body to operate said mechanism in corrective direction, two normally yieldable linkages disposed at opposite sides of said bolster and being each linked to said bolster and to said journal structure, said linkages including respective control devices for varying the linkage rigidity, two inertia-responsive sensing devices mounted on said bolster at opposite sides thereof and being connected to said respective control devices at the corresponding sides of said bolster for causing said linkages to yield relative to vertical movement of said journal structures while exerting opposing force to vertical movement of said bolster due to tilt-correcting operation of said mechanism in order to then mechanically shunt said spring means.

7. The combination of wheel means, a journal structure for said wheel means, a bolster, vehicle spring means movably supporting said bolster on said journal structure, a vehicle body pivotally mounted on said bolster for angular movement relative to said bolster substantially in a vertical plane in parallel to the axis of said wheel means, a tilt-correcting mechanism disposed between said body and said bolster for varying the angular position of said body relative to said bolster, reversible drive means connected to said mechanism, control means having a tilt-responsive sensing device mounted on said body for controlling said drive means in response to occurrence of incorrect banking of said body to operate said mechanism in corrective direction, a mechanical linkage linked to said bolster and to said journal structure and including a hydraulic device with two relatively movable parts, a hydraulic circuit system connected to said device and having a source of hydraulic pressure and valve means for controlling said pressure relative to said device to control relative movement of said parts, an inertia-controlled sensing device mounted on said bolster to respond to vertical bolster movement and connected to said valve means for controlling the latter so that said linkage yields to vertical movement of said journal structure and impedes vertical movement of said bolster due to tilt-controlling operation of said mechanism.

8. The combination of wheel means, a journal structure for said wheel means, a bolster, vehicle spring means movably supporting said bolster on said journal structure, a vehicle body pivotally mounted on said bolster for angular movement relative to said bolster substantially in a vertical plane in parallel to the axis of said vehicle means, a tilt-correcting mechanism disposed between said body and said bolster for varying the angular position of said body relative to said bolster, reversible drive means connected to said mechanism, control means having a tilt-responsive sensing device mounted on said body for controlling said drive means in response to occurrence of incorrect banking of said body to operate said mechanism in corrective direction, a hydraulic power device having a cylinder mounted on said bolster and having a movable member linked to said journal structure, a hydraulic conduit system connected to said cylinder and including a pump for providing hydraulic pressure and valve means for controlling said pressure relative to said device, a sensing device mounted on said bolster and having an inertia member responsive to vertical bolster movement and operatively connected to said valve means for controlling the latter so that said hydraulic device permits vertical movement of said journal structure and impedes vertical movement of said bolster due to tilt-controlling operation of said mechanism.

9. The combination of wheel means, a journal structure for said wheel means, a bolster, vehicle spring means movably supporting said bolster on said journal structure, a vehicle body pivotally mounted on said bolster for angular movement relative to said bolster substantially in a vertical plane in parallel to the axis of said wheel means, a tilt-correcting mechanism disposed between said body and said bolster for varying the angular position of said body relative to said bolster, reversible drive means connected to said mechanism, control means having a tilt-responsive sensing device mounted on said body for controlling said drive means in response to occurrence of incorrect banking of said body to operate said mechanism in corrective direction, a hydraulic power device having a movable member controlled by hydraulic pressure applied to said device, said member being linked to said journal structure, a hydraulic conduit system connected to said power device and including a pump for providing said pressure, and a governing apparatus having valve means connected in said conduit system for controlling said pressure and having an inertia member responsive to vertical bolster movement for controlling said valve means so that said hydraulic device permits vertical movement of said journal structure and impedes the vertical movement of said bolster due to tilt-controlling operation of said mechanism, said hydraulic device and said conduit system and said pump and said governing apparatus being all mounted on said bolster.

10. A position regulator for correcting the banking angle of vehicle bodies, comprising two tilt-controlling jacks for attachment to opposite sides of the body, two reversible electric motors having respective armatures in driving connection with said jacks, a control system for said motors having a generator armature connected to said motor armatures to provide reversible energization therefor and having a field winding for controlling said energization, an exciter connected to said field windings for providing excitation therefor and having two control field windings for controlling said excitation so that the polarity of said excitation depends upon which control field winding is energized at a time, a tilt-responsive sensing device having a pendulous member provided with contact means selectively actuable by said member in response to departure for correct banking and depending upon the direction of said departure, said contact means being connected to said control field windings for causing said motors to simultaneously operate said jacks in the respective directions required to correct said departure.

11. A tilt-correcting regulator for vehicles, comprising a tilt-controlling mechanism, a reversible electric motor in driving connection with said mechanism, a generator for energizing said motor, separately energizable circuit leads, a relay normally connecting said motor to said generator and controllable to instead connect said motor to said leads, a primary tilt-responsive sensing device connected to said generator for causing it to control said motor for operation in tilt-correcting sense when said generator is connected to said motor by said relay, a secondary sensing device responsive to excessive tilt beyond that normally occurring and connected to said relay for controlling it to connect said motor to said leads in order to move said mechanism to a predetermined position, and switch means mechanically associated with said mechanism for disconnecting said motor from said leads when said mechanism reaches said position.

12. A tilt-correcting regulator for vehicles, comprising a tilt-controlling mechanism, a reversible electric motor in driving connection with said mechanism, a generator for energizing said motor, separately energizable circuit leads, a relay normally connecting said motor to said generator and controllable to instead connect said motor to said leads, a primary tilt-responsive sensing device connected to said generator for causing it to control said motor for operation in tilt-correcting sense when said generator is connected to said motor by said relay, a secondary sensing device responsive to excessive tilt beyond that normally occurring and connected to said relay for controlling it to connect said motor to said leads in order to move said mechanism to a predetermined position, a time delay relay interposed between said secondary sensing device and said relay to permit control of said relay only when said excessive tilt persists a given period of time, and switch means mechanically associated with said mechanism for disconnecting said motor from said leads when said mechanism reaches said position.

13. A tilt-correcting regulator for vehicles, comprising a tilt-controlling mechanism, a reversible direct-current motor in driving connection with said mechanism, a direct current generator for energizing said motor, a separately energizable direct-current circuit, a relay normally connecting said motor to said generator and controllable to instead connect said motor to said circuit, a primary tilt-responsive sensing device connected to said generator for causing it to control said motor for operation in tilt-correcting sense when said generator is connected to said motor by said relay, a secondary sensing device responsive to excessive tilt beyond that normally occurring and connected to said relay for controlling it to connect said motor to said leads in order to move said mechanism to a predetermined position, and discriminator switch means geared to said motor and having contact means connected with said circuit for controlling the polarity of connection of said motor to said circuit depending upon the direction of departure of said mechanism from said position, said contact means being in circuit-opening condition to disconnect said motor from said circuit when said mechanism is in said position.

CLINTON R. HANNA.
LAWRENCE B. LYNN.
STANLEY J. MIKINA.

REFERENCES CITED

The following references are of record in the file of this patent:

UNITED STATES PATENTS

| Number | Name | Date |
|---|---|---|
| 2,002,980 | Glezen | May 28, 1935 |
| 2,174,997 | Ronk | Oct. 3, 1939 |
| 2,353,503 | Rost et al. | July 11, 1944 |
| 2,417,526 | Steins et al. | Mar. 18, 1947 |